United States Patent [19]

Gardner

[11] 4,403,873
[45] Sep. 13, 1983

[54] TILTING PAD THRUST BEARING

[75] Inventor: Willis W. Gardner, Waukesha, Wis.

[73] Assignee: Waukesha Bearings Corporation, Waukesha, Wis.

[21] Appl. No.: 338,753

[22] Filed: Jan. 11, 1982

[51] Int. Cl.³ .............................................. F16C 17/06
[52] U.S. Cl. ..................................... 384/306; 384/122; 384/308
[58] Field of Search ............... 384/306, 308, 307, 303, 384/122, 305

[56] References Cited

U.S. PATENT DOCUMENTS

| | | | |
|---|---|---|---|
| 2,874,007 | 2/1959 | Cametti et al. | 384/308 |
| 3,655,250 | 4/1972 | Sprenger . | |
| 3,702,719 | 11/1972 | Hoffman | 384/306 |
| 4,035,042 | 7/1977 | O'Rourke et al. | 384/308 |

Primary Examiner—Lenard A. Footland
Attorney, Agent, or Firm—Wheeler, House, Fuller & Hohenfeldt

[57] ABSTRACT

A tilting pad thrust bearing wherein each bearing pad in a circular array of pads is held in a retainer and is provided with a radially extending rib on the side opposite of the side that receives the thrust load. There are disks that have a planar surface on one side and a spherical surface on an axially opposite side. The respective ribs of the pads bear on the planar surfaces of the disks. The spherical surfaces of the disks bear on angulated wings of two adjacent leveling links in a circular array of links. The links have radial holes and are supported for pivoting on pins that extend radially from the retainer. The periphery of each pin makes tangential line contact with a hole. An extrapolation of the angulated wing surfaces extends through the line contact so there is no moment arm for frictional forces at the point contact on the wings to act through and free pivoting of the leveling links is not impaired.

3 Claims, 5 Drawing Figures

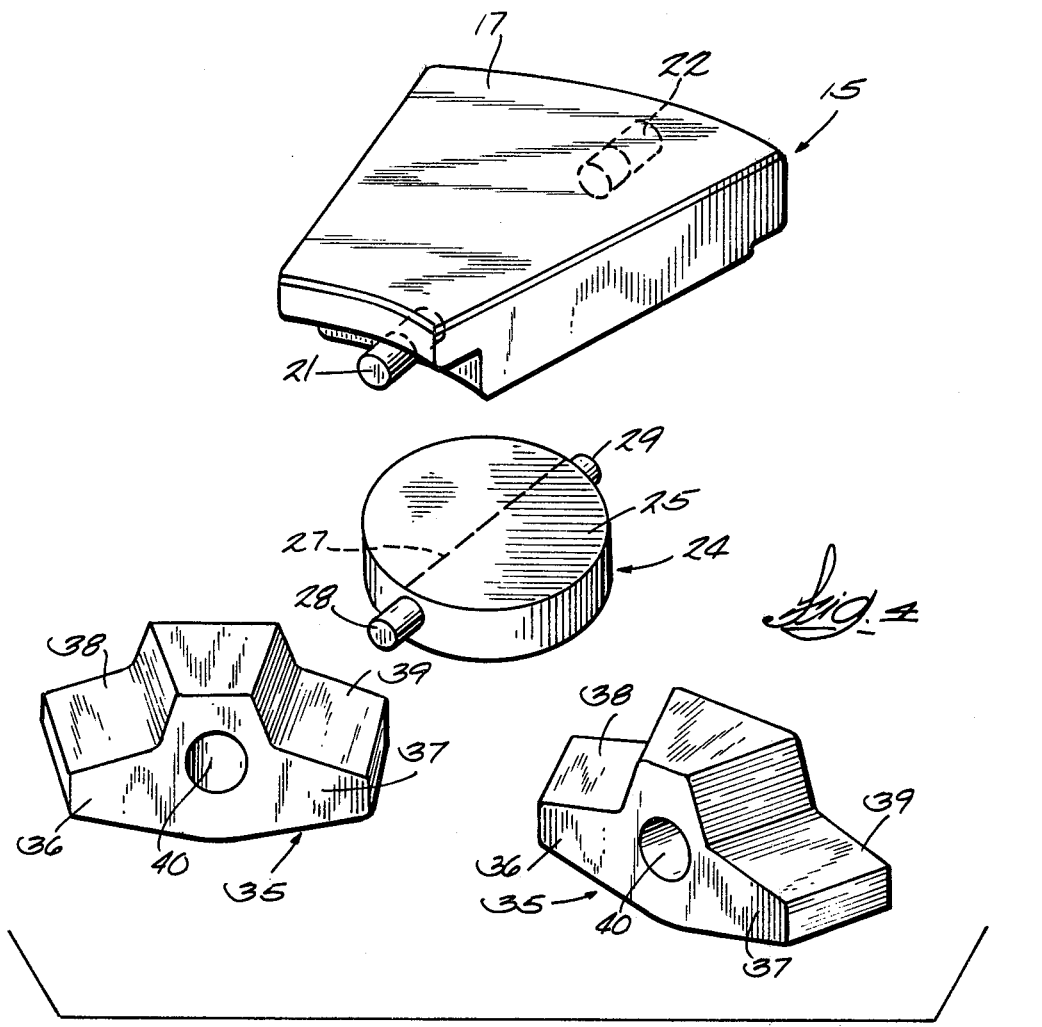
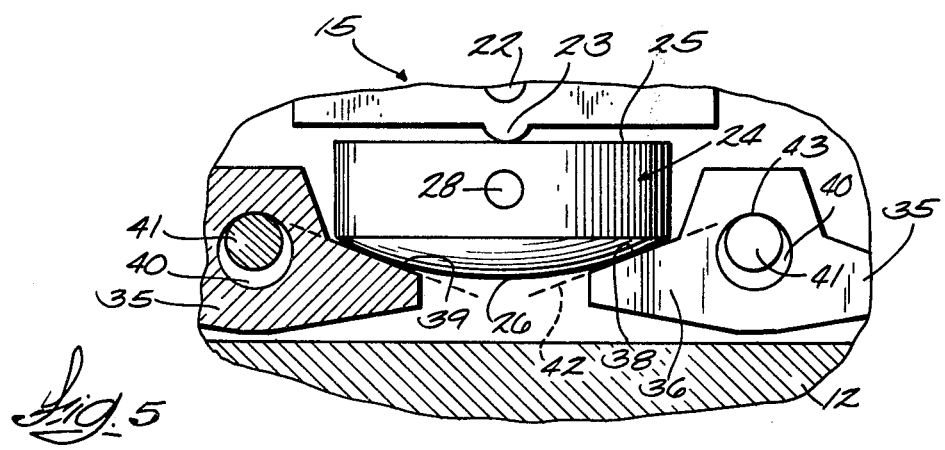

TILTING PAD THRUST BEARING

BACKGROUND OF THE INVENTION

This invention relates to thrust bearing assemblies that typically comprise a retainer ring encompassing a plurality of thrust bearing pads arranged in circumferential spaced relationship around a shaft axis. A shaft that is to be axially supported for rotation usually has a radially extending collar providing a bearing surface that interfaces with the array of thrust pads which are bathed in lubricant. The thrust pads are customarily supported on a circular array of overlapping pivotal rockers or leveling links that transmit forces between each other to equalize the load on the thrust pads. The pads are free to tilt to a limited extent so as to develop a wedge-shaped film of lubricant that supports the load. The load on each bearing pad is inversely proportional to the oil film thickness squared. To equalize the load, the leveling links lower the overloaded thrust pad and raise the underloaded thrust pad. Since the leveling links are in contact, any unbalanced forces are transmitted through the leveling links until equilibrium is reached.

Under actual operating conditions the thrust pads in existing bearing designs are not loaded perfectly evenly even though, theoretically, their loads should be equalized due to the force distributing interactions between the leveling links. Applicant has determined that incomplete equalization is due primarily to friction between contacting areas of the adjacent leveling links. These frictional forces are generally displaced from the pivot points of the leveling links and, hence, the frictional forces act through a moment arm to resist free pivoting of the leveling links that is required for complete load equalization among the thrust pads.

Another characteristic of prior art tilting pad thrust bearings is that the surfaces of the various thrust pads on which the shaft collar runs become slightly convex or crowned in the radial and circumferential directions during actual operation. This is caused by the unequal thermal expansion between the front side of the thrust pad facing the collar where the frictional heat is developed and the back side which is cooler and also by the effect of the distributed load on the front side and a point contact support on the back side. Some convexity or crowning in the circumferential direction is beneficial since it assists in generation of the lubricant wedge. Any radial crowning is detrimental, however. It reduces the hydrodynamic forces inherent in the lubricant wedge and tends to cause breakdown or thinning of the wedge near the center of the thrust pad.

SUMMARY OF THE INVENTION

A primary object of the present invention is to overcome the effects of friction between the leveling links that support the thrust bearing pads.

A further object is to provide a support means for the thrust bearing pads which tends to reduce convexity of the pad bearing surface in the radial direction as compared to that in the circumferential direction.

In accordance with the invention, the thrust bearing pads are provided with a radially extending rib on a side that is remote from the side of the pad that interfaces with the shaft collar. Each pad is supported on a disk that has a planar surface on which the rib of a pad bears and each disk has a spherical surface opposite from its planar surface. Thus, the radially extending rib makes a long line contact on the disk which causes forces to be developed that reduce radial convexity. The disks are supported on leveling links that have angulated but flat wings extending in opposite circumferential directions. The spherical surface of each disk is supported on a wing of two adjacent leveling links. The links have a radial hole and are supported for pivoting on a fixed pin about a radially directed axis. The diameter of the pin is substantially smaller than the hole. The angle of the wings is such that if their flat surfaces are extrapolated, said surfaces will intersect the pivot line between the hole and the pin which extends through the link. The spherical surface of the disks make tangential or point contact with the angular flat surfaces of the wings on the links. The frictional forces developed at these points of contact are directed in the plane of the angulated link wing surfaces and, since the frictional force vector is through the pivot line the frictional force has no moment arm through which to act to resist free pivoting of the links. The point contact between the spherical disks and the link wings provides force equalization in all directions.

How the foregoing general objects and other more specific objects of the invention are achieved will be evident in the more detailed description of a preferred embodiment of the invention which will now be set forth in reference to the drawings.

DESCRIPTION OF THE DRAWINGS

FIG. 4 is an exploded view of a thrust pad segment, a disk and two similar leveling links as seen looking outward from the center of the circular bearing assembly in FIG. 1; and FIG. 5 is a fragmentary enlargement for showing how a bearing pad, a spherical disk and some equalizing links are arranged for cooperating in a manner that eliminates the effect of interlink friction.

DESCRIPTION OF A PREFERRED EMBODIMENT

Figure 1:
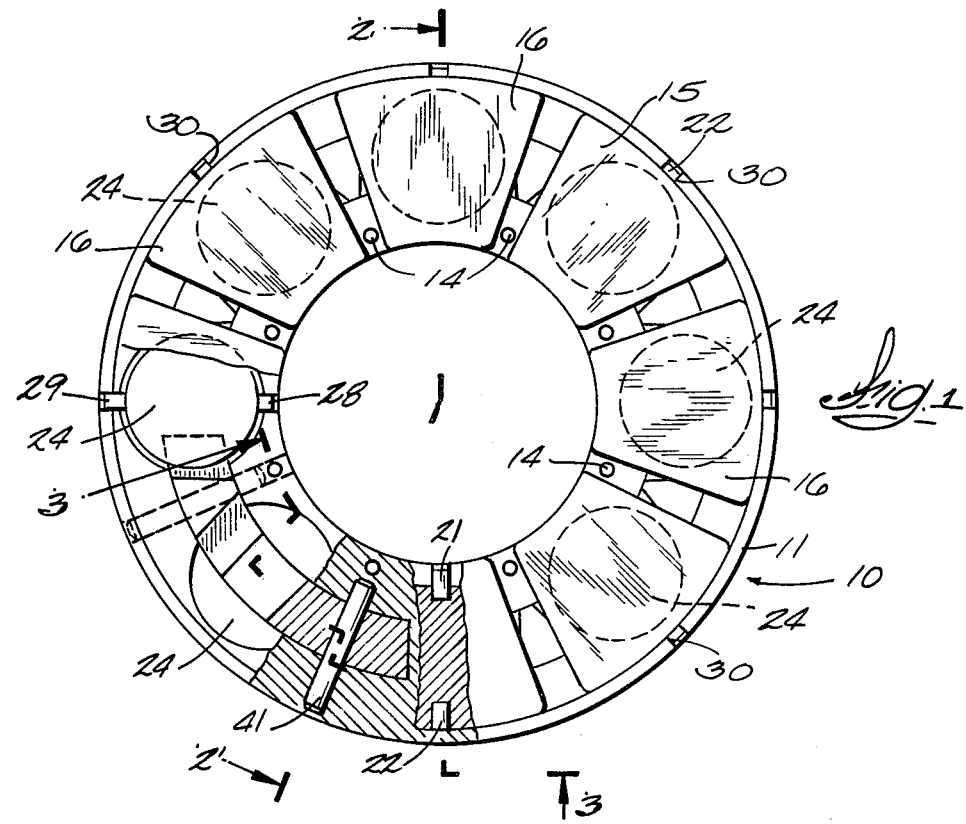
FIG. 1 is a plan view of a tilting pad thrust bearing assembly without a shaft being installed therein and with some parts broken away and other parts shown in section.

As shown in FIG. 1, the bearing assembly comprises an annular retainer that is generally designated by the reference numeral 10. The housing for supporting the retainer and for confining lubricating fluid has been omitted. The retainer has an axially extending annular wall 11 as can be seen best in FIG. 2 which also shows that the annular wall is integral with an annular bottom section 12 of the retainer. The bottom section has an annular cavity 13 in which some load equalizing components are disposed as will be discussed momentarily. The bottom portion has some conduits, such as the one marked 14, for directing fluid lubricant through the bearing assembly.

The assembly includes several circumferentially spaced apart thrust pads such as the one marked 15 in FIG. 1. An isolated view of a thrust pad 15 appears in FIG. 4. The thrust pads are essentially segments of a flat ring. One of the pads, marked 16, in FIG. 2 is shown in section to illustrate that all of the thrust pads are coated with an antifriction material 17 such as babbitt.

Figure 2:
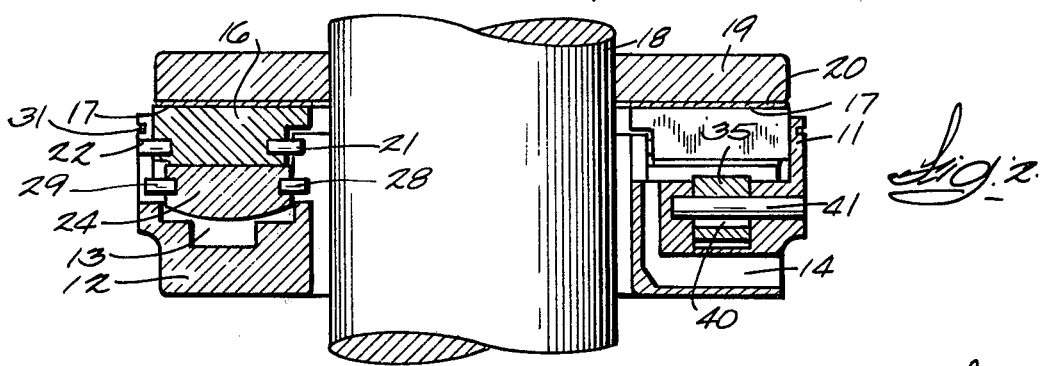
FIG. 2 is a vertical section taken on a line corresponding to the angulated line 2—2 in FIG. 1, except that a fragmentarily illustrated shaft and its collar are installed.

FIG. 2 shows a fragment of the shaft 18 that extends axially the bearing assembly. The shaft has a collar 19 affixed to it. The collar transmits the axial load of the shaft to the thrust pads. As is conventional, the thrust pads are capable of tilting circumferentially to a limited extent about radially directed axes to develop a thin wedge-shaped film of lubricant at the interface 20 between the lower surface of shaft collar 19 and the upper surface of the babbitt layer 17. As is known, the wedge-shaped lubricant film actually supports the load imposed by collar 19. Each thrust pad is provided with a radially inwardly extending pin 21 and a radially outwardly extending pin 22. These pins do not support any load. They simply extend into axial slots, such as the slot marked 30 in FIG. 3, to prevent the thrust pads from moving circumferentially as a result of frictional drag imposed by the rotating collar 19.

Figure 3:
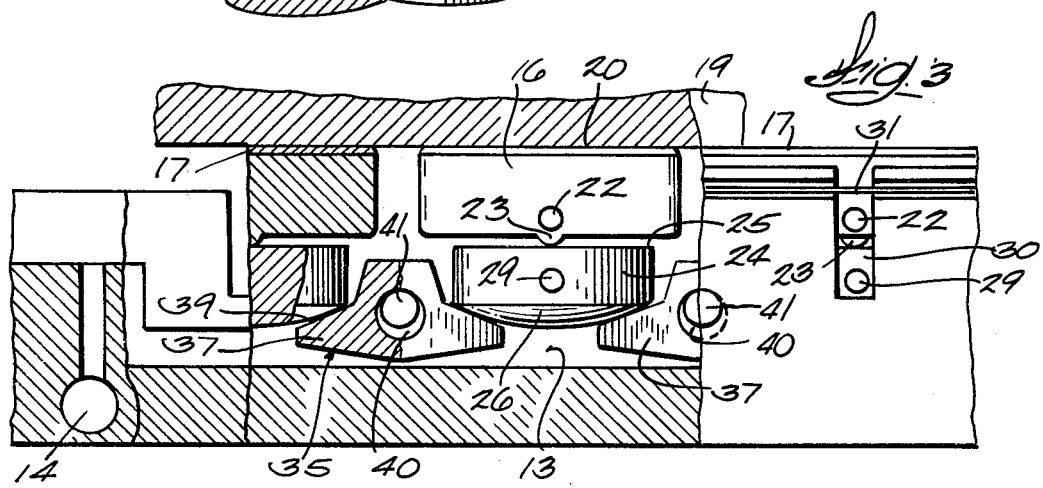
FIG. 3 is a fragmentary vertical section taken on a line corresponding with the irregular line 3—3 in FIG. 1, the parts in FIG. 3 being shown enlarged as compared with FIG. 1.

The retainer 10 is split diametrically to allow it to be assembled on the shaft 18. As shown in FIG. 3, a wire band 31 is disposed in an annular groove around the retainer to hold the thrust pads 16 and disks 24 loosely in the retainer during handling and assembly.

A rib 23 is formed integrally with the bottom surface of each thrust bearing pad or section 16. Ribs 23 are curved in cross section as can be clearly seen in FIGS. 3 and 5. These ribs have a radial length substantially coextensive with the radial length of the thrust pads 16. As shown in FIGS. 3 and 5, the thrust pads are supported on disks 24 which have a planar face 25 and an axially opposite spherical face 26. The curved surface of rib 23 makes tangential line contact with the top planar surface 25 of disk 24. The line of contact is depicted by the dashed line 27 on the top 25 of disk 24 in FIG. 4. It will be evident that regardless of the amount by which the bearing pads tilt or pivot in the circumferential direction, line contact will be maintained between the ribs and top planar surface 25 of the disk. The long rib effectively ties a thrust pad 16 to a disk 24 with respect to any radial tilting or crowning while at the same time allowing free tilting of a thrust pad in the circumferential direction. Moreover, as indicated earlier, applying a force substantially across the entire radial dimension of the thrust pad by means of a long rib results in overcoming undesirable radial convexity or crowning that develops at the thrust pad and collar interface due to the temperature difference between the hotter upper working surface and lower exposed surface of the pad and also due to the distributed mechanical load on the face of the pad and a point contact type of support on the back of the pad. The spherical disks have pins 28 and 29 extending in opposite radial directions as shown in FIG. 4. As can be seen in FIG. 3 where an outside pin 29 is shown, this pin is disposed in slot 30 in retainer wall 11 and functions to prevent disk 24 from being displaced in a circumferential direction.

The spherical faces 26 of each disk 24 in the circular array of disks that supports the circularly arranged thrust pads 16 are supported on a circular array of equalizing links that are identical and are generally designated by the reference numeral 35. As can be seen in any of FIGS. 3, 4 or 5, each leveling or equalizing link 35 has two circumferentially extending angulated wings 36 and 37. The upper surfaces 38 and 39 of these wings are planar. Hence, as will be evident from inspection of FIG. 3 or 5, the spherical surface 26 on disk 24 will make tangential point contact with the planar surfaces 38 and 39 on the wings of adjacent links. As can be seen in any of FIGS. 3-5, each leveling link 35 has a radially extending hole 40 through it. These holes are for permitting the leveling links 35 to be supported on radially extending pins which are all the same and are designated by the reference numeral 41. As exhibited best in FIGS. 1 and 2, pins 41 are fixed in retainer ring 11. Leveling links 35 are pivotable on pins 41. As is clearly evident in FIG. 5, for example, pins 41 have a diameter that is substantially smaller than the diameter of hole 40. Thus, the periphery of pin 41 is tangential to the circular hole 40 in which case a line of contact is developed that has substantial radial length. Pins 41 share the load imposed by the shaft substantially equally.

As indicated earlier, in prior art thrust bearing designs, friction between the leveling links is known to inhibit equalization of the load on the bearing pads through cooperative action of the links. Friction retards free rotation of the leveling links on their pivotal supports. Thus, transfer of force from leveling link to leveling link 35 to obtain equalization thereby is impaired. The manner in which the effect of friction is overcome in the new bearing design disclosed herein will now be discussed in greater detail in reference to FIG. 5.

Consider the angulated planar surface 38 on top of a wing of one of the links 35. An extrapolation of this surface is represented by a dashed line 42. In accordance with the invention, the angle of surface 38 is such that its extrapolation is substantially tangent to the periphery of pin 41 along a line on the pin at whose foremost end the point of contact with bore 40 in link 35 is marked 43. Spherical surface 26 of leveling disk 24 makes point contact with surface 38 and the load force vector at that point is normal to surface 38. There is, however, a frictional component of force developed between spherical surface 36 and wing 38 when there tends to be relative sliding motion at this contact point during the equalizing action. The frictional component must necessarily be directed along the angulated surface 38. Since the frictional component lies on surface 38 and is directed through pivot line 43, the frictional force has no moment arm through which it could act to inhibit free pivoting of link 35. Therefore, the links 35 can tilt freely to balance the thrust load force equally among the circular array of thrust pads 15.

It should be noted too that if a thrust pad 15 has forces applied to it which would tend to tilt it in a radial direction, such force will be relieved by reason of the spherical surfaces 26 on disks 16 being able to roll slightly along their tangential points of contact with the planar surfaces on the top of the leveling link wings such as the one marked 36.

Observe that having the spherical surfaces 26 of the disks 24 make tangential point contact with the angulated planar surfaces on the top of the link wings allows the disks to tilt along a radial line such that the line contact between the ribs 23 and the tops 25 of the disks will be maintained during any reasonable amount of tilting of the thrust pads in the radial direction. This means that the force is always maintained for overcoming the tendency for the thrust pads to crown in the radial direction. Moreover, since the spherical surfaces 26 of the disks can roll freely radially the disks cannot develop forces on the wings of the leveling links which would have a tendency to rock the links 35 radially. With such forces being absent, maintenance of line contact between the outer periphery of the link supporting pins 41 and the insides of the link holes 40 is assured.

Although a preferred embodiment of the invention has been described in detail, such description is intended to be illustrative rather than limiting, for the invention may be variously embodied and is to be limited only by interpretation of the claims which follow.

What is claimed is:

1. A tilting pad thrust bearing comprising:

retainer means, a plurality of bearing pads arranged in said retainer means in circumferentially spaced apart relationship about an axis of rotation, each pad having a surface for interfacing with and supporting a planar rotating member when the bearing is in use and each pad having a rib projecting axially in a direction opposite of said surface and extending radially over a substantial portion of the radial width of the pad, said pads being tiltable to a limited extent relative to said planar rotating member to develop lubricant wedges when said member rotates, a plurality of circumferentially spaced apart disks each having a planar surface on which the respective ribs make radial line contact and each having a spherical surface presented in a direction axially opposite of its planar surface, a plurality of link members each of which is positioned between a pair of said disks, and each of which has a radially extending round hole and wing portions extending in opposite circumferential directions away from the hole, the spherical surface of any disk being in tangential point contact with wing portions of two adjacent disks, and round pins mounted to said retainer means and extending radially through the holes in the respective link members for supporting said link members pivotally, the outside diameter of the pins being substantially less than the diameter of the holes for the pins and holes to contact each other tangentially on a radially extending line.

2. A thrust bearing as claimed in claim 1 in which said wing portions of said link members have flat surfaces that decline in opposite circumferential directions away from the hole, the angle at which they decline being such that a line extrapolated along said flat surface perpendicular to the direction of the axis of the hole will substantially intersect the line of tangency between the hole and the pin.

3. A thrust bearing as claimed in any of claims 1 or 2 wherein said rib is rounded to effect tangential line contact with said disk and to mantain such line contact when the pad tilts.

* * * * *

UNITED STATES PATENT AND TRADEMARK OFFICE
CERTIFICATE OF CORRECTION

PATENT NO. : 4,403,873

DATED : September 13, 1983

INVENTOR(S) : Willis W. Gardner

It is certified that error appears in the above-identified patent and that said Letters Patent are hereby corrected as shown below:

Claim 1, column 6, line 9 delete "disks" and substitute ---link members---.

Signed and Sealed this

Eighth Day of October 1985

[SEAL]

Attest:

DONALD J. QUIGG

Attesting Officer

Commissioner of Patents and
Trademarks—Designate